Patented Sept. 7, 1937

2,092,397

UNITED STATES PATENT OFFICE 2,092,397

PRODUCTION OF 1,4-DIHYDROXY-ALKYL-AMINOANTHRAQUINONE

Karl Koeberle and Christian Steigerwald, Ludwigshafen-on-the-Rhine, Germany, assignors to General Aniline Works, Inc., New York, N. Y., a corporation of Delaware No Drawing. Application April 18, 1936, Serial No. 75,230. In Germany April 20, 1935

2 Claims. (Cl. 260—60)

The present invention relates to a process of producing 1,4-dihydroxyalkylaminoanthraquinones.

We have found that 1,4-dihydroxyalkylaminoanthraquinones are obtained in a smooth manner by heating an anthraquinone containing in the 1-position a group —NHR in which R is a member selected from the class consisting of hydrogen and the alkyl, aralkyl, cycloalkyl, aryl and acyl groups, and in the 4-position a substituent selected from the class consisting of the hydroxyl, nitro, amino, alkylamino, aralkylamino, cycloalkylamino and arylamino groups, with at least two molecular proportions of a hydroxyalkylamine, until the groups in the 1- and 4-positions are replaced by the radical of the hydroxyalkylamine.

As initial materials which are especially suitable for the process according to this invention may be mentioned 1,4-diamino-anthraquinone, 1,4,5-triaminoanthraquinone, 1,4,5,8-tetraminoanthraquinone, 1-amino-4-hydroxyanthraquinone, 1-amino-4-alkylaminoanthraquinones, 1-amino-4-nitroanthraquinones, 1,4-dialkylaminoanthraquinones, 1,5-diamino-4,8-dihydroxyanthraquinone, 1,8-diamino-4,5-dihydroxyanthraquinone, 1-amino-4-acylaminoanthraquinones, 1-amino-4-hexino-4-arylaminoanthraquinones, 1-amino-4-arahydroarylaminoanthraquinones, 1-amino-4-aralkylaminoanthraquinones, 1,4-diarylaminoanthraquinones, 1,4-dihexahydroarylaminoanthraquinones, 1,4-diaralkylaminoanthraquinones, 1-aralkylamino-4-hexahydroarylaminoanthraquinones, 1-alkylamino-4-arylaminoanthraquinones, 1-alkylamino-4-hexahydroarylaminoanthraquinones and 1-alkylamino-4-aralkylaminoanthraquinones.

As hydroxyalkylamines which are especially suitable for the reaction may be mentioned ethanolamine, the propanolamines and the butanolamines.

The reaction is generally speaking carried out while heating, for example at temperatures between about 100° and about 150° C. In many cases the reaction may advantageously be carried out under superatmospheric pressure. Furthermore it is frequently preferable to work in the presence of a diluent such as methanol, ethanol, isobutanol or monochlorbenzene.

The compounds obtainable according to this invention are usually obtained in very good yields and in a state of high purity. They may in most cases be employed with advantage for dyeing cellulose esters and ethers. They may also be employed in part for dyeing fats, oils, waxes, paraffin waxes, benzine, petroleum and other hydrocarbons, lacquers or artificial compositions.

The following examples will further illustrate how the said invention is carried out in practice but the invention is not restricted to these examples. The parts are by weight.

Example 1

A mixture of 20 parts of 1,4-diaminoanthraquinone and 100 parts of ethanolamine is heated for about an hour at about 150° C. while stirring. The mixture is allowed to cool, diluted with methanol and the resulting compound filtered off by suction, washed with methanol and dried. The known compound 1,4-dihydroxyethylaminoanthraquinone is thus obtained in the form of blue crystals. It dyes acetate artificial silk blue shades.

The same compound is obtained by employing 1-amino-4-nitroanthraquinone, 1-methylamino-4-aminoanthraquinone, 1,4 - dimethylaminoan-4-aminoanthraquinone or 1-methylamino-4-hydroxyethylthraquinone instead of 1,4-diaminoanthraquinone. The corresponding 1,4-dihydroxypropylaminoanthraquinone is obtained by employing 1,2-propanolamine or 1,3-propanolamine instead of ethanolamine.

Example 2

A mixture of 20 parts of 1-amino-4-hydroxyanthraquinone and 80 parts of 1,2-propanolamine is heated while stirring at from 125° to 130° C. until the solution has become pure blue. The mixture is then allowed to cool, diluted with methanol and the resulting 1,4-dihydroxypropylamino (1,2) -anthraquinone is filtered off by suction, washed with methanol and dried. It yields blue dyeings on acetate artificial silk.

In a similar manner 1,5-diamino-4-8-dihydroxyanthraquinone may be caused to react with propanolamine, a blue dyestuff is then likewise obtained which yields very powerful dyeings on acetate artificial silk.

Example 3

A mixture of 20 parts of 1,4,5,8-tetraminoanthraquinone and 100 parts of ethanolamine is heated for about three hours while stirring at 150° C. The mixture is allowed to cool and diluted with methanol. The resulting dark blue crystals are filtered off by suction and dried. They yield on acetate artificial silk powerful blue dyeings the shades of which are displaced towards green as compared with those of the dyeings obtained with the initial material and are much better in artificial light.

By varying the duration and temperature of the reaction, compounds may be obtained which yield reddish blue to greenish blue dyeings on cellulose esters and ethers.

In the same manner dyestuffs yielding powerful blue dyeings on acetate artificial silk are obtained by employing 1,4,5-triaminoanthraquinone or 1,4-diamino-5-nitroanthraquinone instead of 1,4,5,8-tetraminoanthraquinone.

*Example 4*

A mixture of 20 parts of 1,4-diaminoanthraquinone and 100 parts of 1,3-propanolamine is heated at 150° C. while stirring until the solution has become blue. It is then allowed to cool and the resulting blue crystals are filtered off by suction, washed with methanol and dried. The compound yields powerful blue dyeings on acetate artificial silk.

Similar blue dyestuffs are obtained by employing for example 1-amino-4-hydroxyanthraquinone, 1-amino-4-nitroanthraquinone, 1-amino-4-aminoanthraquinone, 1,4,5,8-tetraminoanthraquinone, 1,4,5-triaminoanthraquinone or 1,4-diamino-5-nitroanthraquinone instead of 1,4-diaminoanthraquinone.

*Example 5*

A mixture of 20 parts of 1,4-di-normal-butylaminoanthraquinone and 100 parts of ethanolamine is heated at 150° C. for about half an hour while stirring. The mixture is then allowed to cool, the resulting blue crystals are filtered off by suction, washed with methanol and dried. The 1,4 - dihydroxyethylaminoanthraquinone thus obtained dyes acetate artificial silk blue shades.

The same compound is obtained by employing instead of 1,4-di-normal-butylaminoanthraquinone 1,4-diethylaminoanthraquinone, 1,4-di-normal-propylaminoanthraquinone, 1,4-di-normal-amylaminoanthraquinone, 1-ethylamino-4-normal-propylaminoanthraquinone, 1-normal-butylamino - 4 - hydroxypropylaminoanthraquinone.

*Example 6*

A mixture of 10 parts of 1,4-dianilidoanthraquinone and 50 parts of ethanolamine is heated at 150° C. for about 1 hour while stirring. The mixture is then allowed to cool and the resulting compound is filtered off by suction, washed with methanol and dried. The 1,4-dihydroxyethylaminoanthraquinone thus obtained in the form of blue crystals dyes acetate artificial silk blue shades.

The same compound is obtained by employing, instead of 1,4-dianilidoanthraquinone, 1-methylamino-4-anilidoanthraquinone, 1-methylamino - 4 - toluidoanthraquinone, 1-methamino-4-benzylaminoanthraquinone, 1 - methyl-4-cyclohexylaminoanthraquinone or 1-anilido-amino-4-cyclohexylaminoanthraquinone.

*Example 7*

A mixture of 20 parts of 1-amino-4-cyclohexylaminoanthraquinone and 100 parts of ethanolamine is heated at from 125° to 130° C. for about 2 hours while stirring. The mixture is then allowed to cool and the resulting compound is filtered off by suction, washed with methanol and dried. The 1,4-dihydroxyethylaminoanthraquinone thus obtained in the form of a blue powder dyes acetate artificial silk blue shades.

The 1-amino - 4 - cyclohexylaminoanthraquinone may be replaced by 1-amino-4-anilidoanthraquinone, 1 - amino-4-toluidoanthraquinone, 1-amino-4-benzylaminoanthraquinone or 1-amino-4-benzoylaminoanthraquinone. In each case 1,4-dihydroxyethylaminoanthraquinone is obtained as the reaction product.

*Example 8*

A mixture of 10 parts of 1-normal-butyl-amino-4-benzylaminoanthraquinone and 50 parts of 1—2-propanolamine is heated while stirring for about 2 hours at about 150° C. After cooling, the resulting 1—4-di-beta-hydroxypropylaminoanthraquinone is filtered off by suction, washed with methanol and dried. It is a blue powder which dyes acetate artificial silk blue shades.

Instead of the said initial compound, the compounds serving as starting materials in Examples 6 and 7 may be employed.

What we claim is:

1. A process of producing 1,4-dihydroxyalkylaminoanthraquinones which comprises heating an anthraquinone containing in the 1-position a group of —NHR in which R is a member selected from the class consisting of hydrogen and the alkyl, aralkyl, cycloalkyl, aryl and acyl groups, and in the 4-position a substituent selected from the class consisting of the hydroxyl, nitro, amino, alkylamino, aralkylamino, cycloalkylamino and arylamino groups with at least two molecular proportions of a hydroxyalkylamine, until the groups in the 1- and 4-positions are replaced by the radical of the hydroxyalkylamine.

2. A process of producing 1,4-dihydroxyethylaminoanthraquinone which comprises heating an anthraquinone containing in the 1-position a group —NHR in which R is a member selected from the class consisting of hydrogen and the alkyl, aralkyl, cycloalkyl, aryl and acyl groups, and in the 4-position a substituent selected from the class consisting of the hydroxyl, nitro, amino, alkylamino, aralkylamino, cycloalkylamino and arylamino groups, with at least two molecular proportions of ethanolamine, until the groups in the 1- and 4-positions are replaced by the radical of ethanolamine.

KARL KOEBERLE.
CHRISTIAN STEIGERWALD.